United States Patent [19]

Schrecke et al.

[11] 4,324,442
[45] Apr. 13, 1982

[54] DEVICE FOR SUPPLYING AN OIL-AIR MIXTURE TO BEARING LOCATIONS

[75] Inventors: Horst G. Schrecke, Dittelbrunn; Hermann Glöckner, Schweinfurt, both of Fed. Rep. of Germany

[73] Assignee: SKF Kugellagerfabriken GmbH, Schweinfurt, Fed. Rep. of Germany

[21] Appl. No.: 126,438

[22] Filed: Mar. 3, 1980

[30] Foreign Application Priority Data

Mar. 10, 1979 [DE] Fed. Rep. of Germany ... 7906703[U]

[51] Int. Cl.³ ............................................. F16C 33/66
[52] U.S. Cl. .................................. 308/187; 308/189 R
[58] Field of Search ................. 308/76, 187, 189 R, 308/188, 125, 122, 123, 314 OT

[56] References Cited

U.S. PATENT DOCUMENTS

| | | | |
|---|---|---|---|
| 1,378,658 | 5/1921 | Clement | 308/187 |
| 1,893,995 | 1/1933 | Jung | 308/187 X |
| 2,043,885 | 6/1939 | Davidson | 308/187 |
| 2,447,671 | 8/1948 | Schuck | 308/187 |
| 2,986,433 | 5/1961 | Herrmann | 308/187 |
| 3,439,963 | 4/1969 | Hein et al. | 308/187 X |
| 4,241,959 | 12/1980 | Frister | 308/187 |

FOREIGN PATENT DOCUMENTS

641192 10/1979 U.S.S.R. ........................... 308/187

*Primary Examiner*—James E. Bryant, III
*Attorney, Agent, or Firm*—Daniel M. Rosen

[57] ABSTRACT

A device for supplying an oil-air mixture to a bearing location from an oil reservoir which is arranged on a shaft. The oil is held by an absorbent and retentive material, the oil reservoir being in a bore of a revolving machine part and including a closed annular container filled with an absorbent and retentive material, fixed next to the bearing to be lubricated on a shaft and provided with substantially radial passages opening at its periphery into a space communicating with one side of the bearing, and at its bore into grooves in communication with the other side of the bearing.

10 Claims, 2 Drawing Figures

DEVICE FOR SUPPLYING AN OIL-AIR MIXTURE TO BEARING LOCATIONS

This invention relates to high speed bearing lubrication. In the lubrication of high-speed bearings, it is necessary to keep the quantity of oil in the bearing small so that the rotary resistance and hence the temperature remains low.

For this purpose, in long-term lubrication, it is known that a lubricator may be provided next to a rolling bearing, said lubricator consisting of a container open towards the rolling bearing and filled with an absorbent material, laden with liquid lubricant. In this known device, the lubricant is released from the lubricant reservoir, as for example by a stream of air generated by the cage of the rolling bearing. This device has the disadvantage however that some of the oil-air mixture is conveyed through the bearing unused and is wasted insofar as lubrication is concerned.

To avoid this disadvantage, it is known that in such lubricating devices the lubricant reservoir may be provided at the bore or at the periphery with cast-on or molded-on annular sealing flanges to seal off the bearing space. In these known devices, however, it is not possible to regulate the lubricant supply accurately.

It is therefore the object of the present invention to provide a device for supplying an oil-air mixture to a bearing location from an oil reservoir, arranged on a shaft, in which the oil is retained by an absorbent and retentive material, whereby long-term lubrication without loss of lubricant is made possible.

In accordance with the present invention, the oil-air mixture conveyed through the bearing, having transferred some oil to the bearing for lubrication, is returned to the oil reservoir, replenished with oil, and conveyed back to the bearing, thereby ensuring full utilization of the oil reserve. In addition, the supply of lubricant to the bearing can be accurately controlled. A further advantage of the present invention is that it consists of few parts, is simple and inexpensive to produce, easy to assemble, and requires practically no maintenance.

The forgoing objects and brief description of the present invention will become more apparent from the following more detailed description and appended drawings, wherein.

Figure 1:
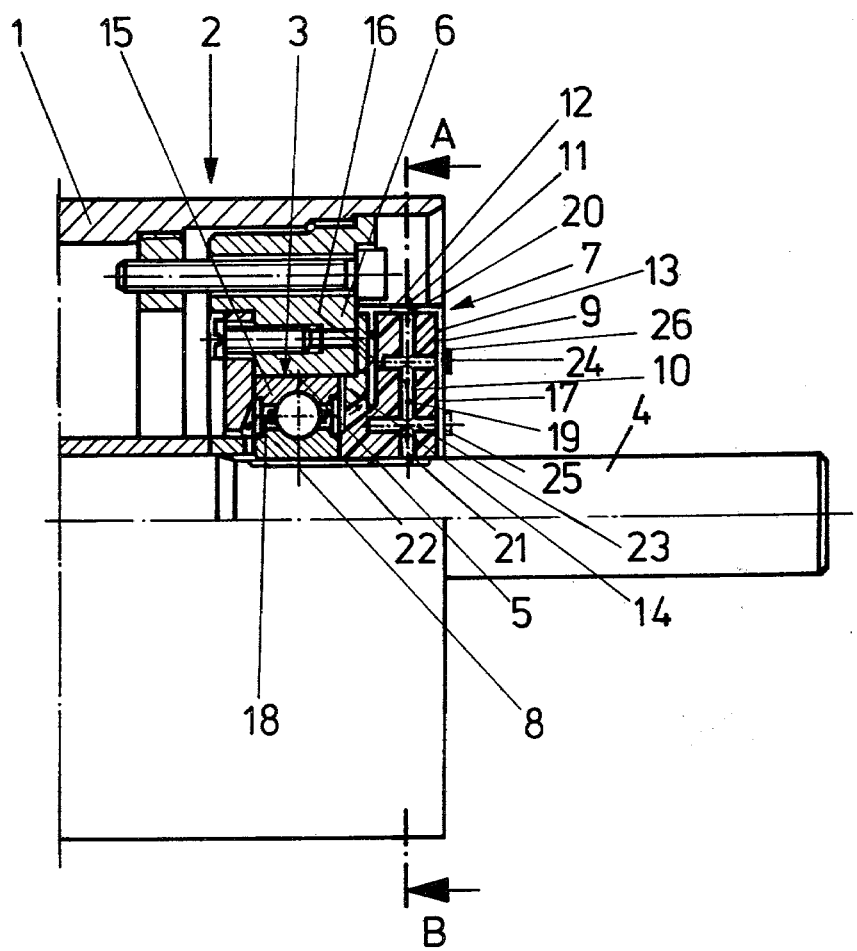
FIG. 1 shows a drive cylinder, the upper half in section, of a winding means.
Figure 2:
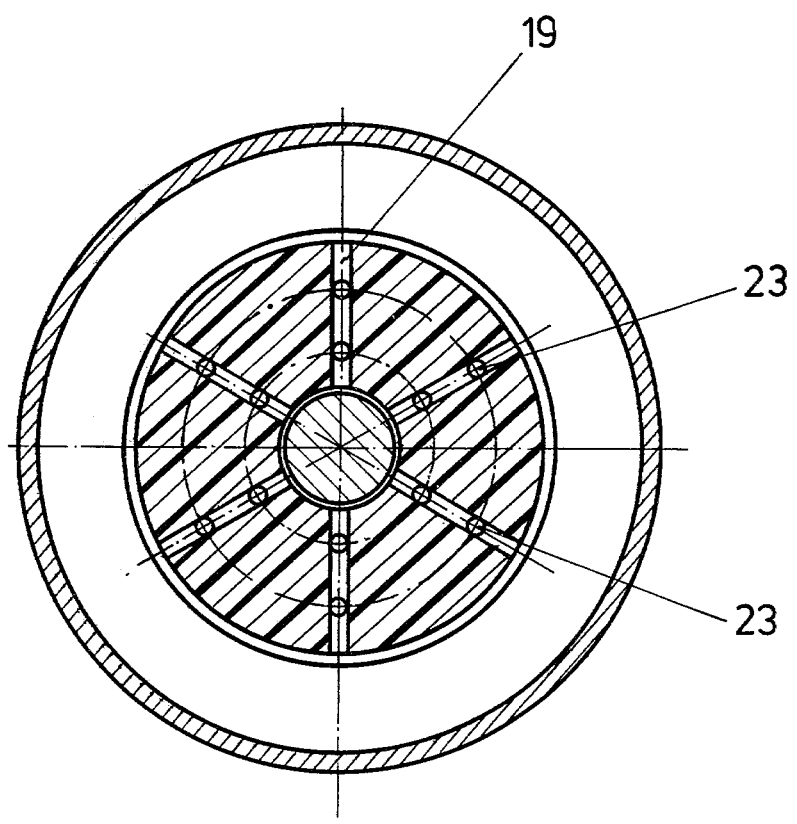
FIG. 2 shows a section A-B of the drive cylinder of FIG. 1.

Each end of a tubular shell 1 of the drive cylinder 2 is mounted on a rolling bearing 3 arranged on a shaft 4 and set in the bore 5 of a part 6 connected to the shell 1 to accommodate the bearing. An oil reservoir 7 is provided on the shaft 4, in contact with the outer face of the inner race 8. The reservoir 7 consists of an annular container 9 of sheet metal or plastic, filled with an absorbent and retentive material 10, and a sheet-metal cap 11 covering the periphery 12 and the face 13 of the annular container 9 away from the bearing 3, the cap 11 surrounding the container 9 at a short distance and extending nearly to the part 6 accommodating the bearing. A guide plate 14 is attached to part 6, in contact with the revolving race 15 and arranged at a distance from the face 16 of the annular container 9, so that the face and periphery of container 9 are surrounded by an annular space 17 opening into the space 18 between the races of the bearing. The absorbent and retentive material 10 has radial passages 19 communicating with the annular space 17 by way of openings 20 at the periphery of the annular container 9 and, by way of openings 21, with grooves 22 conveying the oil-air mixture from the side of the bearing away from the reservoir into the space 18. Each radial passage 19 communicates with one or more axial passages 23, opening into the annular space 17 through openings 24 in the face of container 9 away from the bearing 3. Additional air required is supplied from the surrounding air through openings 25 in the cap 11 and cleaned by filters 26.

The mode of operation of this device is as follows.

The rotation of the rolling bearing bearing 3 generates a continuous current of air flowing past the guide-plate 14 into the annular space 17. Some of the air flow passes through the opening 20 into the radial passages 19 in the retentive material 10 and, depending on the air pressure, entrains a certain amount of oil, which mixes with the air. The rest of the air flow passes through the openings 24 into the axial and radial passages 19, 23, where it is likewise enriched with oil. The oil-air mixture is then passed through the axial grooves 22 in shaft 4 from the side away from the oil reservoir 7 through the bearing 3, some of the oil being consumed to lubricate the bearing 3. The depleted oil-air mixture is then again passed into the reservoir 7, where it is again replenished with oil.

The invention is not limited to the embodiment described by way of example. Modifications in design may be made in the spirit of the invention. Thus, for example, the guideplate 14 rotating with the part 6 accommodating the bearing may be provided with feed grooves, for example spiral grooves, on the side towards the reservoir 7, so that the air current generated by the revolving parts of the bearing will be intensified. Further, it is also possible for example to supply several bearing locations arranged on a shaft with one oil reservoir by way of associated supply lines.

If the rolling bearing 3 is lubricated with grease, the reservoir 7 may be filled with an oil base of the lubricating grease used, and the oil-air mixture may be supplied to the grease in small amounts, thus replacing the oil base as it is consumed. In this way the usability of the grease is maintained over a long period of time.

What is claimed is:

1. In a device for supplying an oil-air mixture to a bearing location from an oil reservoir, arranged on a shaft, in which the oil is held by an absorbent and retentive material, the combination comprising said oil reservoir being in a bore of a revolving machine part and including a closed annular container filled with an absorbent and retentive material, fixed next to the bearing to be lubricated on a shaft and provided with substantially radial passages opening at the periphery thereof into a space communicating with one side of the bearing and at the bore thereof into grooves in communication with the other side of the bearing.

2. The device according to claim 1, wherein said bearing is supported in a bearing support in said bore, and comprising a sheetmetal cap arranged at a short distance from a peripheral surface of the reservoir and from the face of the annular container away from the rolling bearing, and extending proximate to said bearing support.

3. The device according to claim 1, comprising a bearing support positioned to support the revolving race of the bearing and having a guide plate in contact with said revolving race of the bearing and arranged at a distance from the face of the container.

4. The device according to claims 3, wherein said guide plate is provided with oil feed grooves on the side towards the container.

5. The device according to claim 3 wherein said space communicating is annular and wherein said annular space formed by the annular container, the sheetmetal cap and the guide plate opens into the space between the races of the bearing.

6. The device according to claim 1, wherein said space communicating is annular and wherein the retentive material has radial passages communicating with said annular space through openings on the periphery of the annular container and with grooves through openings.

7. The device according to claim 1, wherein said space communicating is annular and wherein each radial passage communicates with said annular space through one or more axial passages and openings.

8. The device according to claim 2, wherein the sheet-metal cap has on its face one or more openings closed off by filters.

9. The device according to claim 1, wherein said space communicating with one side of the bearing is annular, and said grooves are axial.

10. The device according to claim 9, wherein said bearing has spaced inner and outer races, one side of the space between the races communicating with the other side of the space by way of said annular space, said passages and said axial grooves in the shaft.

* * * * *